(12) United States Patent
Biskeborn et al.

(10) Patent No.: US 7,161,764 B2
(45) Date of Patent: Jan. 9, 2007

(54) THIN-FILM TAPE HEAD HAVING SINGLE GROOVE FORMED IN HEAD BODY AND CORRESPONDING PROCESS

(75) Inventors: Robert G. Biskeborn, Hollister, CA (US); Annayya P. Deshpande, San Jose, CA (US); Calvin S. Lo, Saratoga, CA (US); Kevin T. Luong, San Jose, CA (US); Abel J. Taina, San Jose, CA (US); Artemio-Juan Torres, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 1213 days.

(21) Appl. No.: 09/938,458

(22) Filed: Aug. 23, 2001

(65) Prior Publication Data

US 2003/0039070 A1 Feb. 27, 2003

(51) Int. Cl.
*G11B 5/187* (2006.01)
*G11B 5/60* (2006.01)

(52) U.S. Cl. .................. 360/122; 360/129; 360/121

(58) Field of Classification Search ............... 360/122, 360/129, 121
See application file for complete search history.

(56) References Cited

U.S. PATENT DOCUMENTS

| 4,949,208 A | * | 8/1990 | Milo et al. ................. 360/122 |
| 5,237,476 A | * | 8/1993 | Bischoff et al. ............ 360/126 |
| 5,883,770 A | | 3/1999 | Biskeborn et al. ...... 360/130.21 |
| 5,905,613 A | | 5/1999 | Biskeborn et al. .......... 360/130 |
| 5,997,381 A | | 12/1999 | Dee et al. ...................... 451/5 |
| 6,122,147 A | | 9/2000 | Fahimi et al. ............... 360/221 |
| 6,611,398 B1 | * | 8/2003 | Rumpler et al. ............ 360/129 |
| 6,690,542 B1 | * | 2/2004 | Wang ........................ 360/129 |
| 6,781,792 B1 | * | 8/2004 | Biskeborn ................... 360/129 |

* cited by examiner

*Primary Examiner*—Brian E. Miller
(74) *Attorney, Agent, or Firm*—Zilka-Kotab, PC

(57) ABSTRACT

A magnetic head according to another embodiment includes a head body including a top face, a bottom face, a pair of elongated side faces, and a pair of short end faces; at least one transducer formed in communication with the top face of the head body; and a single groove formed in the top face of the head body and extending between the transducers and one of the side faces of the head body. A method for manufacturing a magnetic head is also presented.

10 Claims, 11 Drawing Sheets

THIN-FILM TAPE HEAD HAVING SINGLE GROOVE FORMED IN HEAD BODY AND CORRESPONDING PROCESS

FIELD OF THE INVENTION

The present invention relates to thin-film recording heads, and more particularly, this invention relates to improving the manufacturing process of thin-film recording heads and the structure thereof.

BACKGROUND OF THE INVENTION

Conventional recording heads for linear tape drives have small transducers incorporated into a large head assembly to span the full width of the tape. For recording heads fabricated using thin-film wafer technology, this requires that the head either be fabricated individually on a wafer which is at least as wide as the recording tape and lapped individually to the proper shape, or be fabricated as a small part and assembled with larger pieces and the full assembly lapped individually to the proper shape.

Prior art FIG. 1 illustrates a wafer 100 on which a plurality of heads 102 may be manufactured. As shown, the wafer 100 includes two columns of multiple rows of heads 102. During the fabrication of the wafer 100, an array of heads 102 including transducers and auxiliary circuits are fabricated on a common substrate in a deposition of metallic and non-metallic layers. The auxiliary circuits are sometimes referred to as electrical lap guides (ELGs). Patterning of the array of transducers and ELGs is accomplished using photolithography in combination with etching and lift-off processes. The finished array or wafer is then optically and electrically inspected and subsequently cut into smaller arrays of heads 102. Next, individual heads 102 are machined, at a surface 106 which will eventually face the recording medium, to obtain a desired transducer height (sometimes referred to as the stripe height (SH) or to obtain a desired inductive transducer height sometimes referred to as the throat height (TH).

Prior art FIG. 2 illustrates a wafer 200 including a plurality of strips of closures 202 attached thereto. Such closures 202 define a plurality of slots 204 in which the aforementioned contacts 206 associated with the ELGs reside. Such closures 202 have recently become a common part of wafer processing in view of the benefits they afford in resultant heads. More information on the manufacture and use of closures 202 and the related benefits may be found with reference to U.S. Pat. Nos. 5,883,770 and 5,905,613 which are incorporated herein by reference in their entirety.

Prior art FIG. 3 illustrates one of the heads 300 set forth in FIG. 1 with a closure 302 attached thereto. As shown, the present head 300 is detached from a wafer. Since the head 300 is generated from a wafer structure, the head 300 is extremely thin in shape and form. In order to increase the stability of the head 300 for the suitable use thereof, the head 300 must be attached to a beam 304 of some sort formed of a rigid material. Such beams 304 are often referred to as a "U-beams." One stringent requirement in attaching the head 300 to an associated beam 304 is that the relative position of the head 300 and beam 304 be precisely aligned. Absent such alignment, the operation of the head 300 may be compromised.

There is thus a need for a method and apparatus for the precise attachment of a head 300 and a beam 304.

Yet another problem arises when attempting to dice the heads 300 on a wafer. In the prior art, a traditional magnetic head saw blade may be used to cut the heads 300 from the wafer. Recently, however, the use of the closures 302 such as that shown in FIG. 3 has complicated such process. In particular, the increased thickness of the material to be cut has been increased since a slight portion of the closure 302 must also be diced.

FIG. 4 illustrates a prior art saw blade 400 in the process of dicing a head 402 equipped with a closure 404. As shown, the increased thickness of the combined head 402 and closure 404 cause the blade to slightly bend due to the cutting forces resulting from cutting the additional material. This bending, in turn, results in non-planarity in the operating surface 406 of the head 402.

There is thus a need for a method and apparatus capable of dicing a head equipped with a closure while maintaining the planarity of the head operating surface.

FIG. 5 is an end view illustration of one particular type of bidirectional tape head. As shown, a head 560 is provided with a flat transducing surface 561 and a row of transducers on the surface of gap 562. An electrical connection cable 563 connects the transducers to the read/write channel of the associated tape drive. Alumina overcoat 564 protects the transducers and forms a slope discontinuity edge with respect to the flat transducing surface 561. A slope discontinuity edge 565 is formed parallel to the gap 562 at the side of the flat transducing surface 561 opposite the gap surface.

To control the overwrap angle of the tape 566 at edge 565, an outrigger 567 is provided. The outrigger 567 may be formed by cutting a groove 568 in the head 560. A taper 569 may be lapped on the outrigger 567, preferably at an angle about midway between the expected wrap angles the head will be presented with for various cartridges. The depth of the taper 569 is controlled so that the line from edge 565 to edge 570 is at the desired overwrap angle with respect to the flat transducing surface 561.

The head penetration into the tape 566 of a cartridge is controlled so that at the minimum wrap angle 571, the tape just touches the edge 570. Thus, for various cartridges, the tape wrap can move between the positions indicated by 571 and 572, while the outrigger 567 maintains a constant wrap angle onto the flat transducing surface 561. More information on the head design shown in FIG. 5 may be found with reference to U.S. Pat. No. 5,905,613, which is incorporated herein by reference in its entirety.

Unfortunately, the above design requires two actions to afford the accompanying benefits, namely the cutting of the groove 568 and the lapping of the taper 569. As is well known, each action that is required during the process of thin-film magnetic head manufacture creates much expense.

There is thus a need for a technique of affording the benefits of the groove 568 and taper 569 of FIG. 5, with less of a manufacturing expense.

DISCLOSURE OF THE INVENTION

A magnetic head according to one embodiment includes a head body with a substantially rectangular configuration including a top face, a bottom face, a pair of elongated side faces, and a pair of short end faces; at least one transducer formed in communication with the top face of the head body; a closure with a substantially rectangular configuration having a length substantially equal to the head body, the closure coupled to a first one of the side faces of the head body coincident with the top face thereof; and a single groove formed in the top face of the head body and extending between the at least one transducer and a second one of the side faces, the single groove defined by a first surface positioned in a plane substantially parallel with the side faces and defined by edges coincident with the top face and the end faces, and a second surface positioned in a plane substantially parallel with the top and bottom faces and defined by edges coincident with the first surface, the end faces and the second side face; wherein the single groove is adapted for providing a discontinuity edge and controlling an overwrap angle of a tape sliding along the at least one transducer.

A magnetic head according to another embodiment includes a head body including a top face, a bottom face, a pair of elongated side faces, and a pair of short end faces; at least one transducer formed in communication with the top face of the head body; and a single groove formed n the top face of the head body and extending between the transducers and one of the side faces of the head body.

A method for manufacturing a magnetic head according to one embodiment includes providing a head body including a top face, a bottom face, a pair of elongated side faces, and a pair of short end faces, wherein a transducer is formed in communication with the top face of the head body; and forming a single groove in the top face of the head body such that the single groove extends between the at least one transducer and one of the side faces of the head body.

DESCRIPTION OF THE DRAWINGS

For a fuller understanding of the nature and advantages of the present invention, as well as the preferred mode of use, reference should be made to the following detailed description read in conjunction with the accompanying drawings.

Prior art

Prior art

Prior art

Prior art

Prior art

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Beam and Magnetic Head Bonding Apparatus

Figure 6:
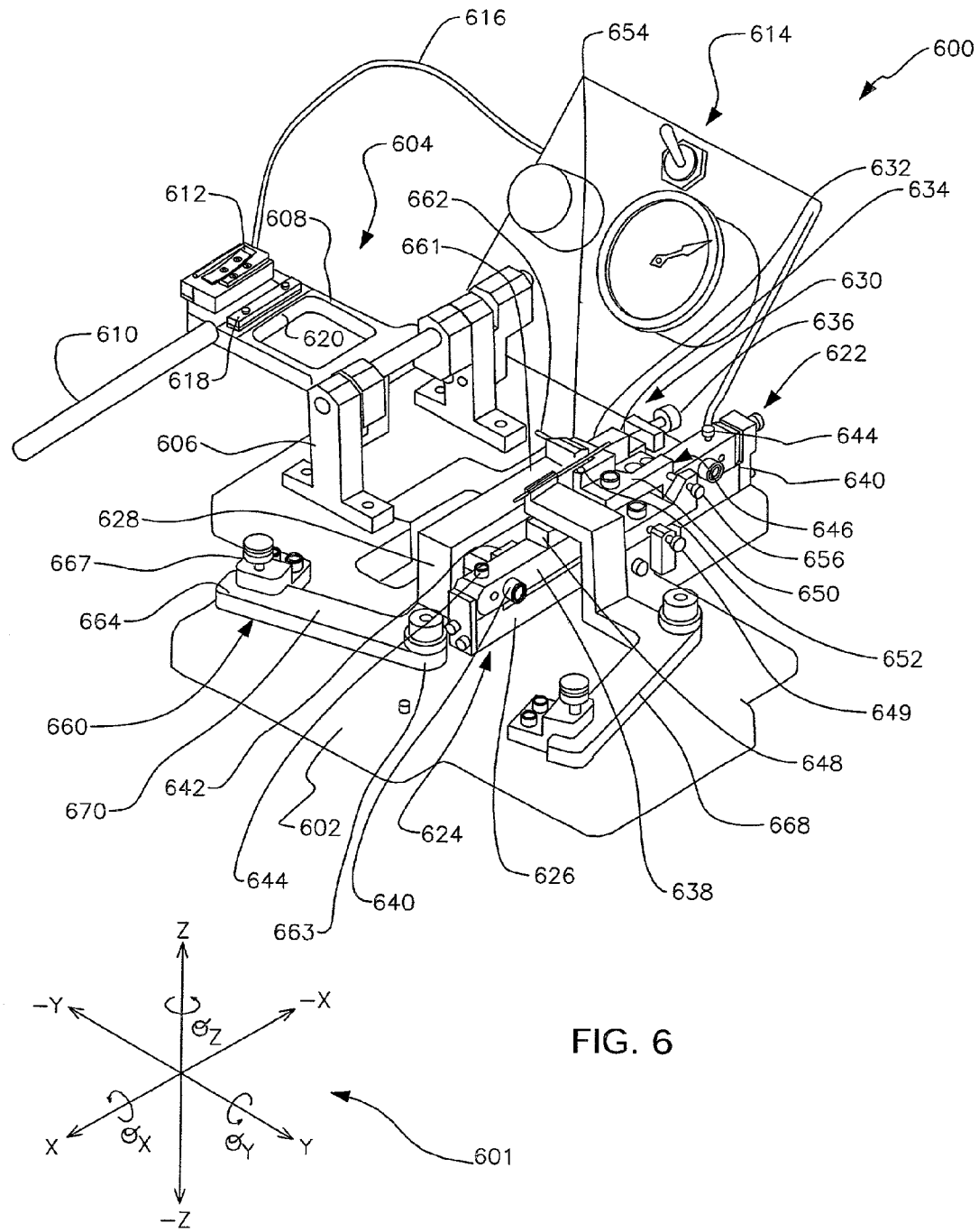
FIG. 6 is a perspective view of an apparatus for precisely attaching a thin-film head to a beam.
Figure 6A:
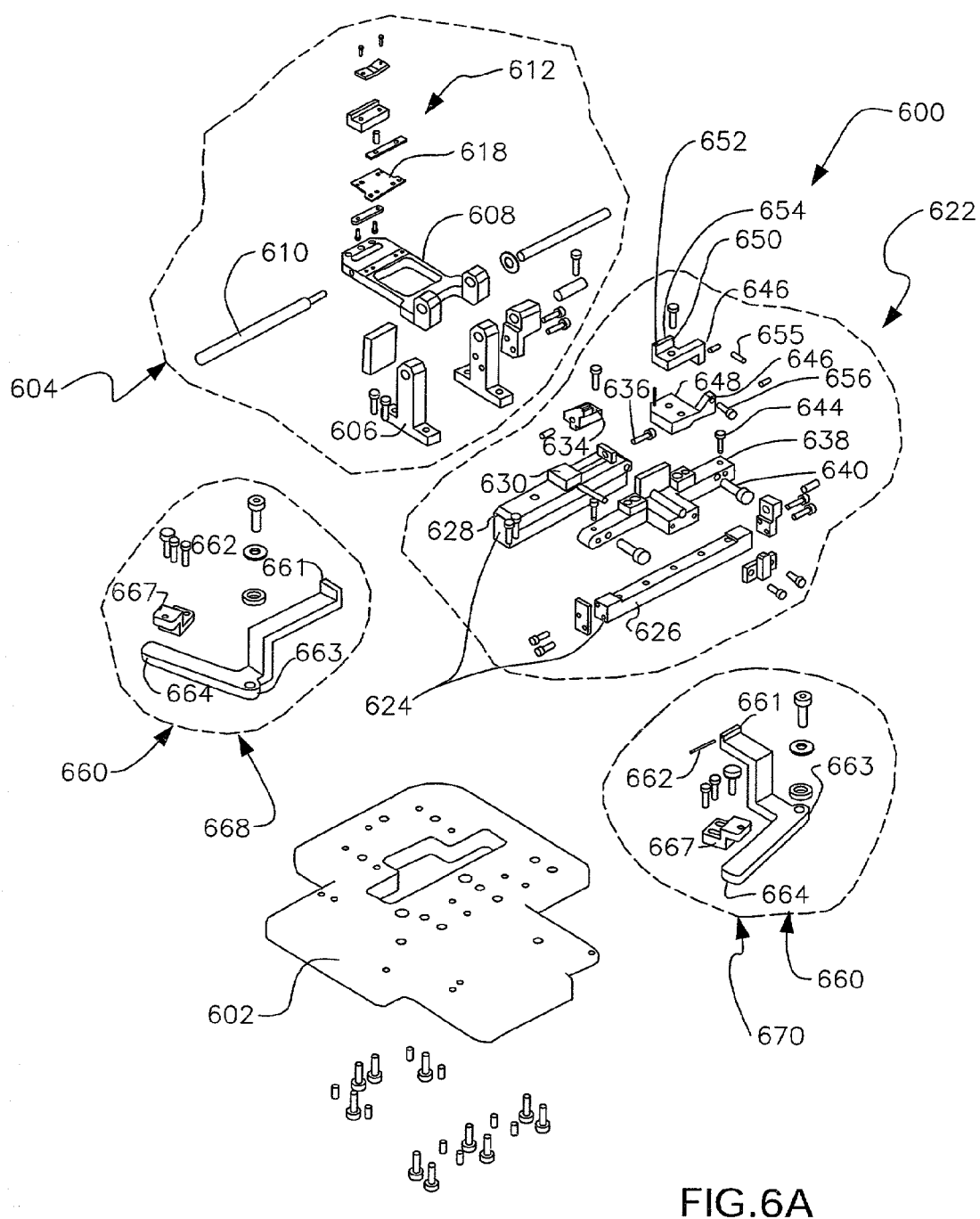
FIG. 6A illustrates an exploded view showing the various components of the apparatus of FIG. 6.

FIG. 6 is a perspective view of an apparatus 600 for precisely attaching a thin-film head to a beam. As will soon become apparent, this is accomplished by allowing relative alignment of the head and the beam in six directions 601. Such directions 601 are shown in the lower right-hand corner of FIG. 6. For further detail regarding the components of the present apparatus 600 of FIG. 6, FIG. 6A illustrates an exploded view showing the various components along with the associated fasteners, couplings, etc. of the apparatus 600.

In the context of the present embodiment, a head may refer to any magnetic head capable of operating (i.e. reading, writing, etc.) in conjunction with a tape. Further, the beam may refer to any rigid support that may be attached to the head for support purposes. In one embodiment, the beam may take the form of a "U-beam."

A base 602 is provided including a head mounting assembly 604 positioned thereon. The head mounting assembly 604 includes a pair of stanchions 606 fixedly mounted on a first side of the base 602. A pivot arm 608 is provided having a first end pivotally coupled to the stanchions 606 about an axis parallel with an x-axis. See directions 601. The pivot arm 608 further has a second end with a handle 610 and a head holder 612 coupled thereto for securely and precisely receiving a head thereon.

As shown in FIG. 6, the head holder 612 is attached to a plate 618 which is in turn screwably coupled to the second end of the pivot arm 608 for allowing the placement of a shim 620 between the plate 618 and the second end of the pivot arm 608. The use of the shim 620 in this manner allows the adjustment of the head in a θz direction. See directions 601.

The head mounting assembly 604 further includes a vacuum assembly 614 coupled to the head holder 612 via a hose 616. Optionally, the vacuum assembly 614 includes gauges and a control switch for controlling purposes. In use, the vacuum assembly 614 serves for securing a head thereto utilizing a vacuum, in a manner that will soon become apparent.

As an option, a lever (not shown) may be provided for facilitating the extraction of the head from the head holder 612. In use, the lever may be used to eject the head against the force of the vacuum. As yet another option, the pivot arm 608 may be biased against one of the stanchions 606 in order to abate any "play" in the pivoting of the pivot arm 608. This is done to ensure no movement in any direction other than the pivoting action about an axis parallel to the x-axis.

Also provided is a beam mounting assembly 622 including a support member 624 having a first portion 626 with a rectangular configuration having a first height. The support member 624 of the beam mounting assembly 622 is fixedly mounted on a second side of the base 602. The support member 624 is positioned along an axis parallel with the x-axis. The support member 624 further includes a second portion 628 with a rectangular configuration having a second height greater than the first height. The second portion 628 of the support member 624 is fixedly mounted to the base 602 adjacent to the first portion 626 of the support member 624.

The beam mounting assembly 622 further includes a beam holder 630 positioned on a top surface of the second portion 628 of the support member 624. The beam holder 630 includes a pair of short end edges and a pair of long side edges. The beam holder 630 is adapted for receiving a beam 632 thereon.

The beam holder 630 includes an x-axis stopper 634 positioned at a first one of the short end edges of the beam holder 630 for abutting the beam 632 when positioned on the beam holder 630. It should be noted that the beam holder 630 is slidably coupled to the top surface of the second portion 628 of the support member 624 in a direction parallel to the x-axis. By this structure, adjustment of the beam 632 is permitted along the x-axis. As an option, such sliding may be controlled by use of a screw 636 that is rotatably coupled to the support member 624 and screwably coupled to the beam holder 630.

An intermediate member 638 of the beam mounting assembly 622 is equipped with a size and shape substantially similar to the first portion 626 of the support member 624. In use, the intermediate member 638 is adapted for being positioned on top of the first portion 626 of the support member 624 and further along a side of the second portion 628 of the support member 624.

The intermediate member 638 includes a pair of smooth holes formed at ends thereof in parallel with a y-axis. See FIG. 6A. Such smooth holes are sized for loosely receiving a pair of screws 640 which are in turn screwably coupled to a side of the second portion 628 with at least one shim 642 therebetween. The augmented size of the holes is adapted for allowing adjustment of the beam 632 along the y-axis and in a θx direction by way of the shim 642. See directions 601.

The intermediate member 638 further includes a pair of threaded holes (see FIG. 6A) formed completely therethrough at ends thereof, each along an axis parallel with a z-axis for screwably receiving a pair of screws 644. Such screws abut a top of the first portion 626 of the support member 624 for allowing adjustment of the beam 632 along the y-axis and in a θy direction.

Still yet, the beam mounting assembly 622 includes an upper member 646 having a lower slider segment 648 with a rectangular configuration. The lower slider segment 648 of the upper member 646 of the beam mounting assembly 622 is slidably coupled to a top of the intermediate member 638 along an axis parallel with the y-axis. Such slidable coupling is preferably controlled by way of a screw 649.

This may be accomplished by positioning the lower slider segment 648 in a track formed in the intermediate member 638. Further, a rotatable coupling may be provided between the screw 649 and any fixed portion of the base 602 or support member 624. Moreover, a screwable coupling may be provided between the screw 649 and the lower slider segment 648. Of course, any other means of accomplishing the same may be employed.

An upper pivoting segment 650 of the upper member 646 is pivotally coupled at a first side 652 thereof to the lower slider segment 648. Such coupling is performed formed about an axis parallel with the z-axis. The upper pivoting segment 650 further has a second side 654 defining a y-axis stopper for abutting the beam 632 along a first one of the long side edges of the beam holder 630. By this design, macro adjustment of the beam 632 is afforded along the y-axis.

As an option, a spring 655(see FIG. 6A) may be coupled between the upper pivoting segment 650 and the lower slider segment 648. Such spring serves for biasing the second side of the upper pivoting segment 650 away from the beam 632. Associated therewith is a screw 656 screwably coupled to an arm extending from the lower slider segment 648. In use, the screw 656 may be used for abutting the upper pivoting segment 650 to selectively determine an extent to which the upper pivoting segment 650 pivots toward the beam 632. This in turn allows micro adjustment of the beam 632 along the y-axis.

Yet another component of the present embodiment is a pair of stabilizers 660 each with a first end 661 having a spring-biased pin 662 mounted therein and an intermediate portion 663 pivotally coupled to the base 602 along an axis parallel with the z-axis. A second end 664 of each of the stabilizers 660 is slidably situated on a top surface of the base 602. Such second end is adapted for being fixed with respect to the base 602 via a clamp 667.

The stabilizers 660 includes a first stabilizer 668 with the pin 662 thereof adapted for abutting the beam 632 along a second one of the long side edges of the beam holder 630. A second stabilizer 670 is provided with the pin 662 thereof adapted for abutting the beam 632 along a second one of the short end edges of the beam holder 630.

In use, the head mounting assembly 604 is adapted for attaching the head secured in the head holder 612 with the beam 632 secured in the beam holder 630 upon the pivoting of the head mounting assembly 604. Prior to pivoting, the beam 632 and head may be precisely aligned along six (6) degrees of freedom, namely along an x-axis, y-axis, z-axis, θx direction, θy direction, and θz direction.

Figure 6B:
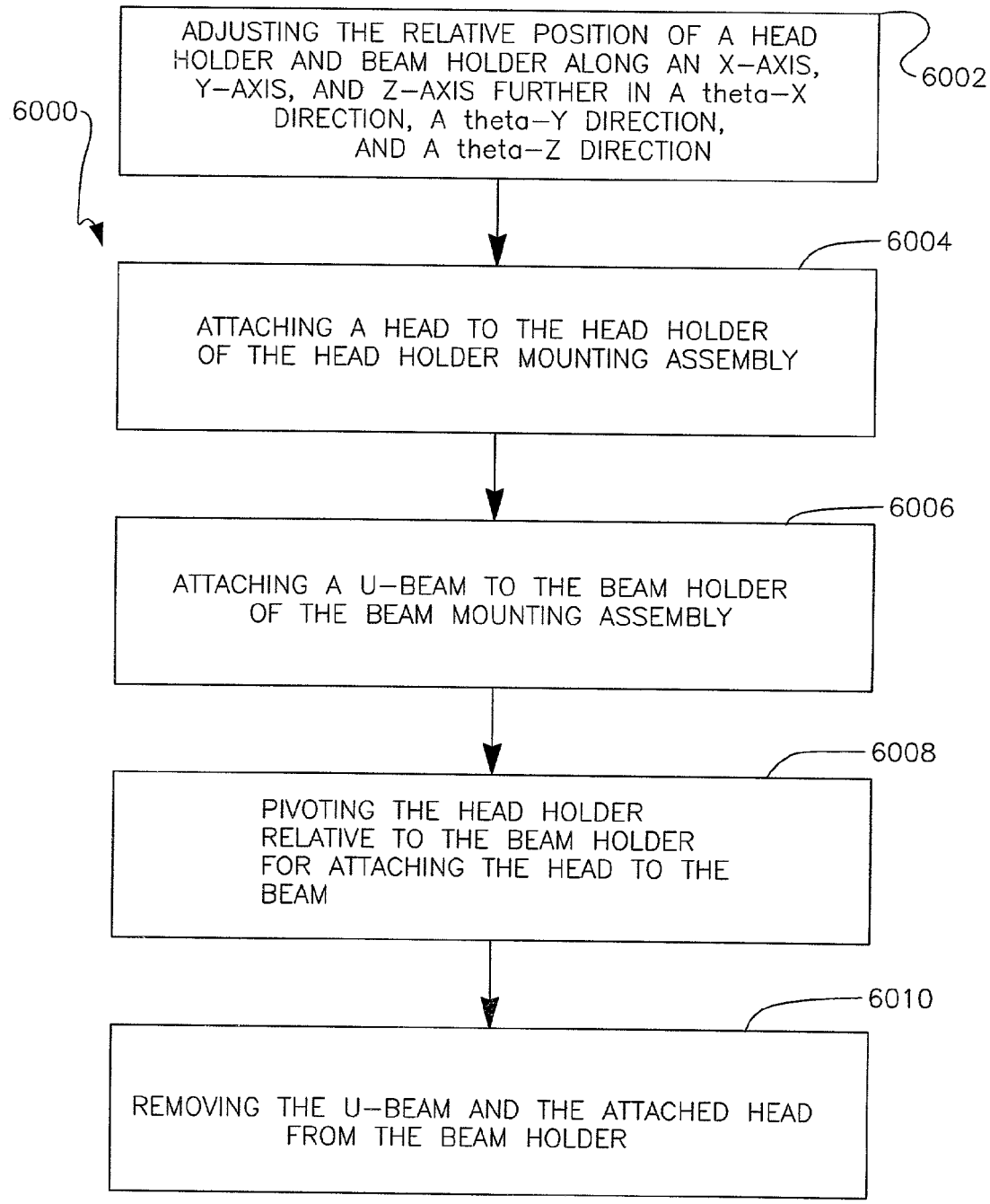
FIG. 6B illustrates a method for precisely attaching a thin-film head to a beam.

FIG. 6B illustrates a method 6000 for precisely attaching a thin-film head to a beam. In one embodiment, the present method 6000 may be carried out in the context of the forgoing apparatus 600. Of course, however, the present method 6000 may also be implemented in the context of any desired machine.

Initially, in operation 6002, the relative position of a head holder and beam holder is adjusted along an x-axis, y-axis, and z-axis and further in a θx direction, θy direction, and θz direction. As mentioned earlier, such adjustment is carried out so that the head is precisely attached to the beam. Next, in operation 6004, a head is attached to the head holder of the head holder mounting assembly. This may be accomplished utilizing a vacuum assembly, or any other desired mechanism.

Next, a beam is attached to the beam holder of the beam mounting assembly. Note operation 6006. The head holder is then pivoted relative to the beam holder for attaching the head to the beam. See operation 6008. It should be noted that the vacuum assembly may be disengaged at this point.

Improved Saw Blade Apparatus

Figure 1:
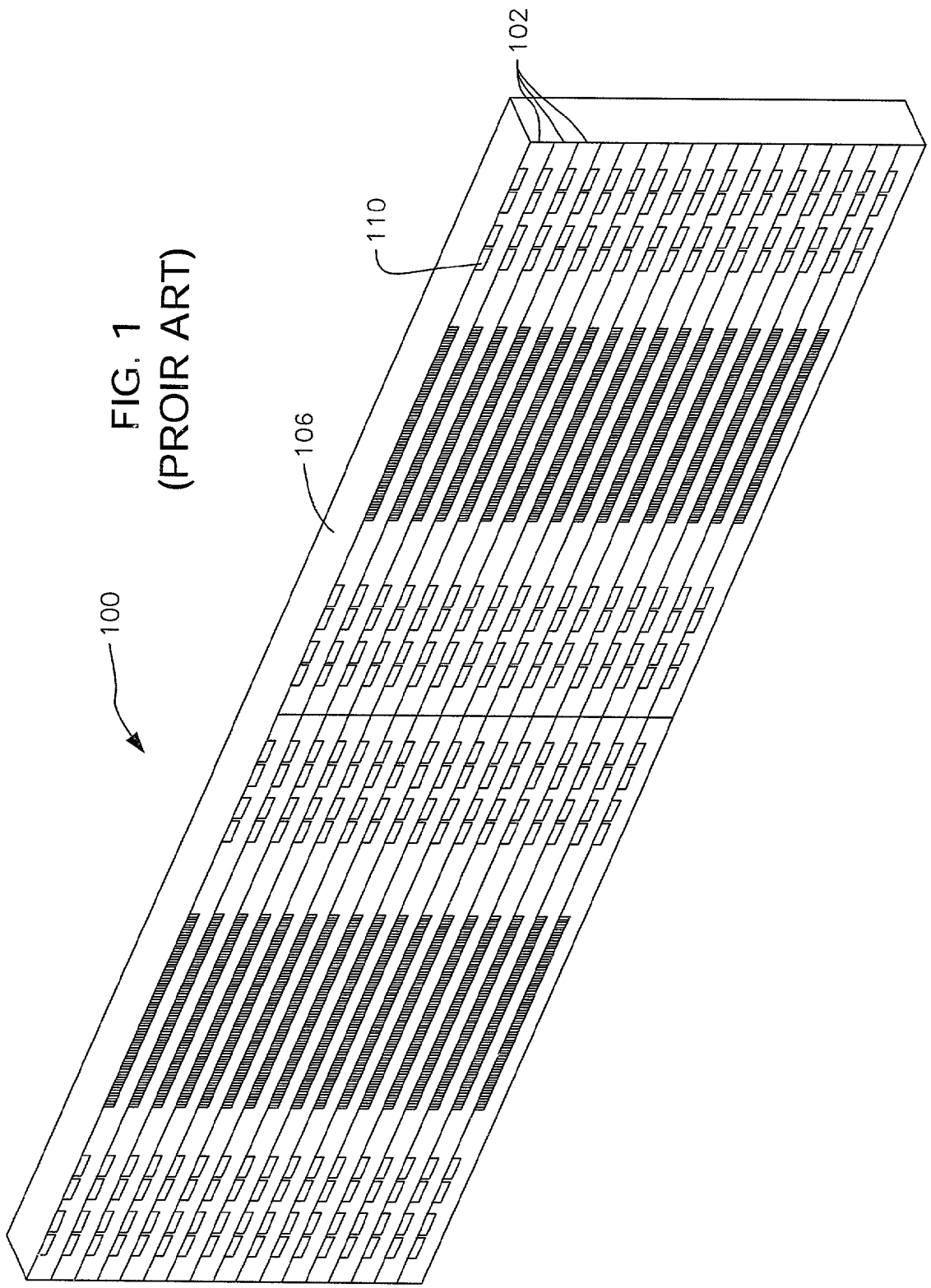
FIG. 1 illustrates a wafer on which a plurality of heads may be manufactured.
Figure 2:
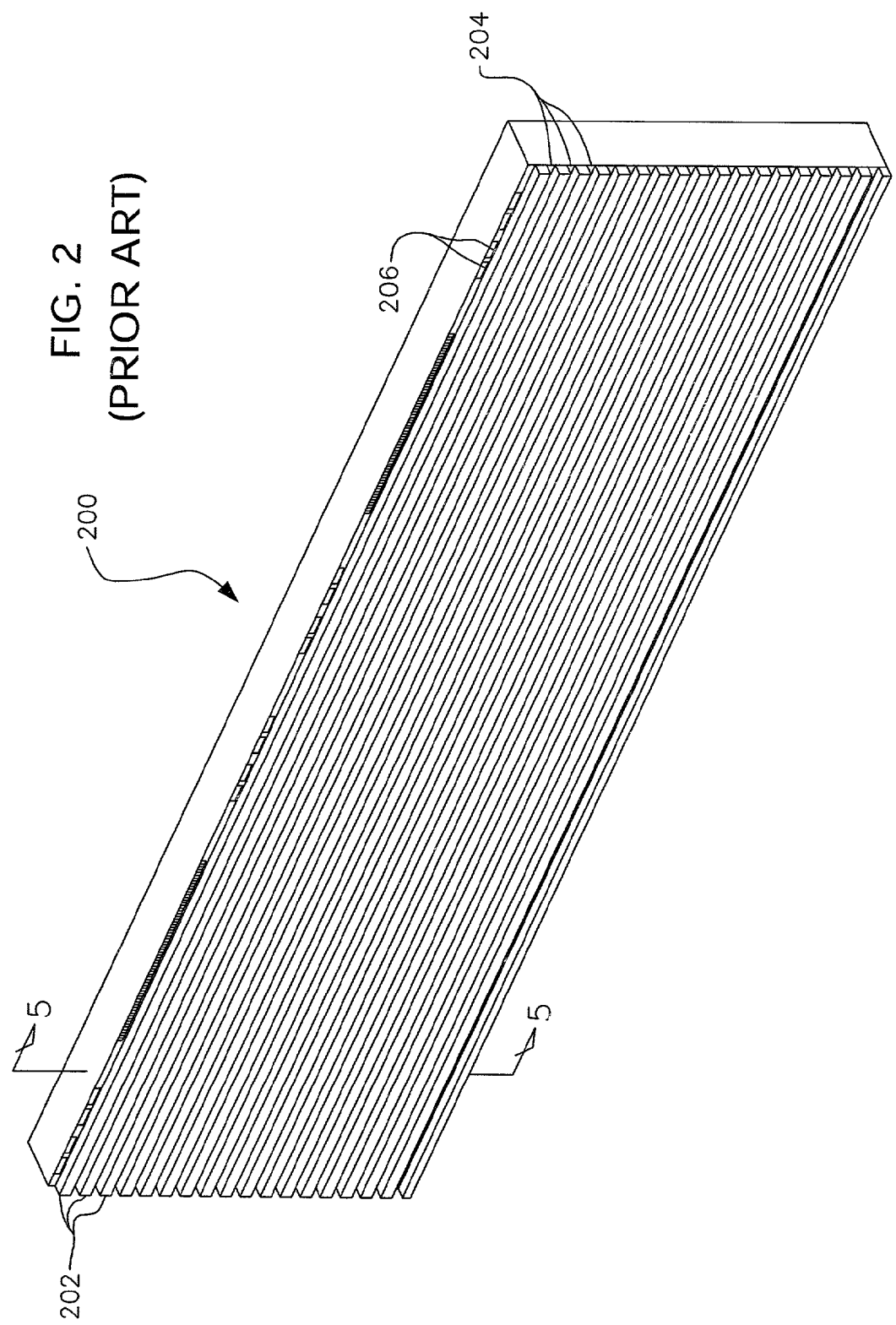
FIG. 2 illustrates a wafer including a plurality of strips of closures attached thereto.
Figure 3:
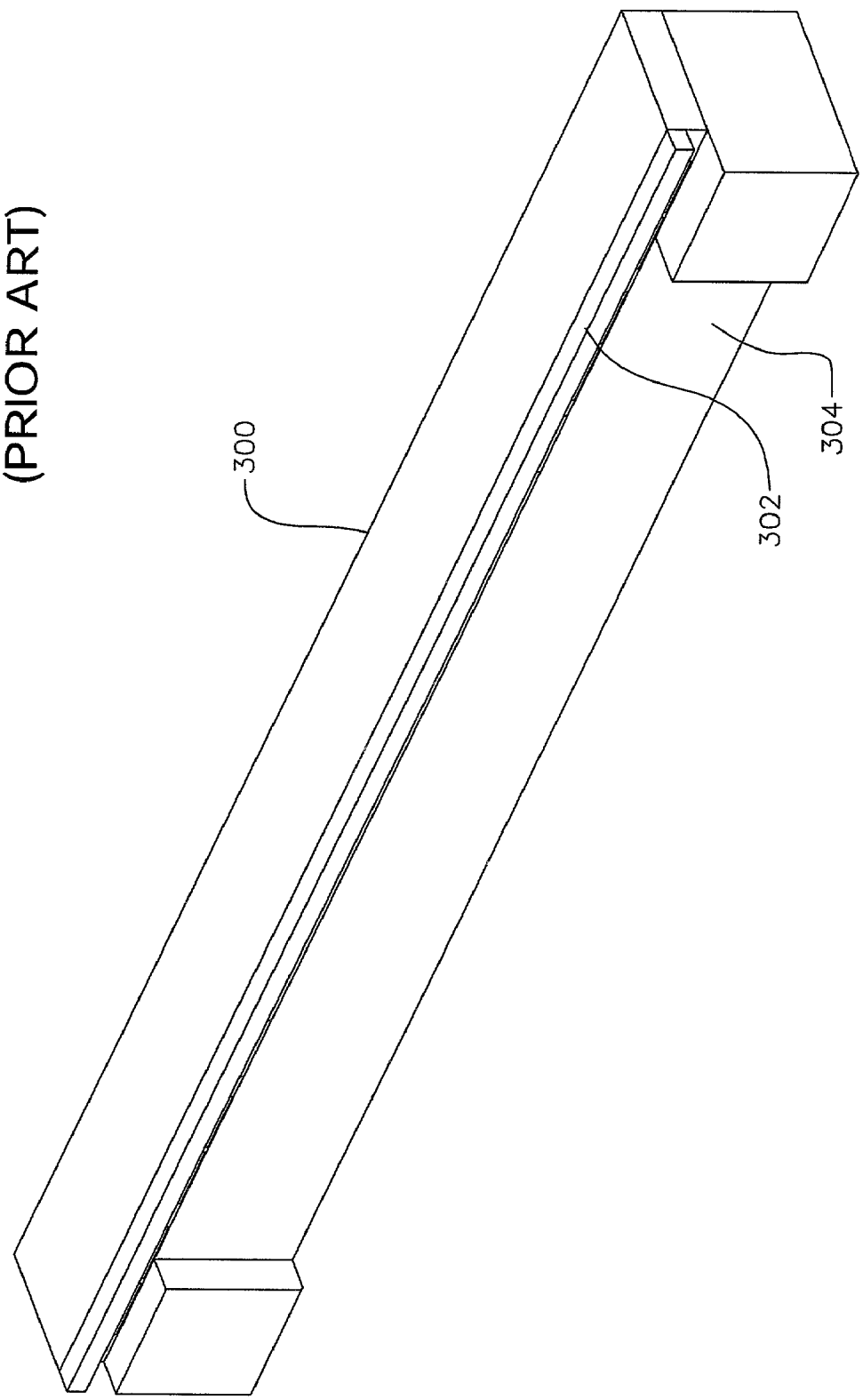
FIG. 3 illustrates one of the heads set forth in FIG. 1 with a closure attached thereto.
Figure 4:
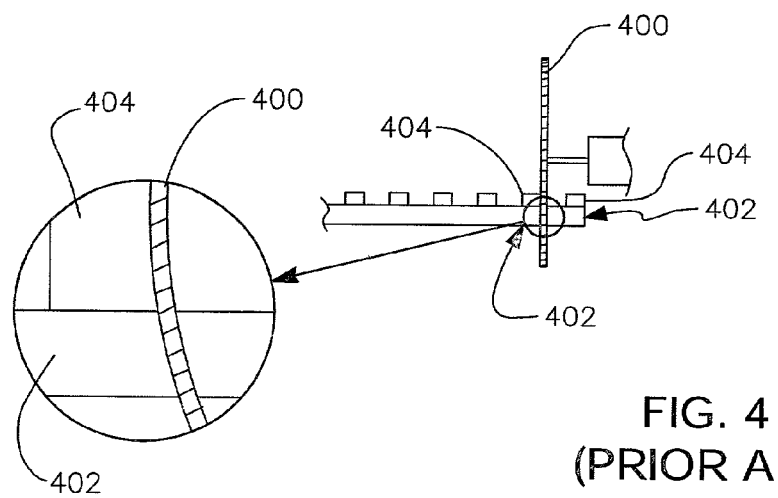
FIG. 4 illustrates a prior art saw blade in the process of dicing a head equipped with a closure.
Figure 7:
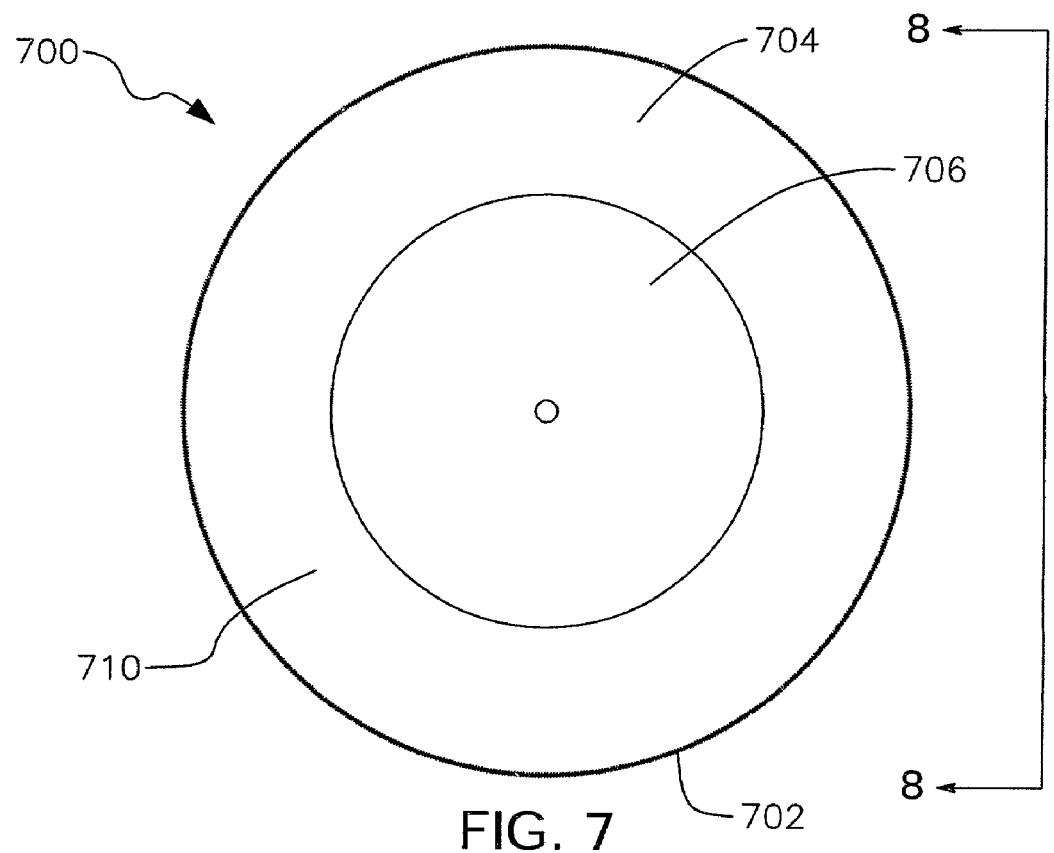
FIG. 7 illustrates a side view of a strengthened saw blade capable of affording heads with a planar operating surface, in accordance with one embodiment.
Figure 8:
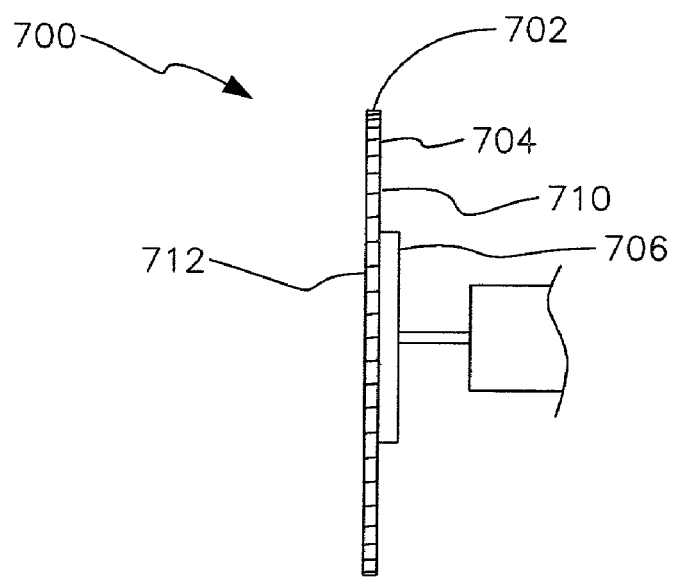
FIG. 8 is a side view of the saw blade taken along line 8—8 of FIG. 7.

FIGS. 7 through 8 illustrate a rigid saw blade 700 for dicing a thin-film head from a wafer in a manner that prevents non-planarity in a surface on which the tranducers of the head operate on an associated tape. As mentioned earlier during reference to prior art FIG. 4, conventional saw blades are subject to bending due to the increased thickness of the wafer resulting from the use of closures. This bending of the saw blade, in turn, results in non-planar head surfaces which affords less than optimal operational characteristics.

FIG. 7 illustrates a side view of a saw blade 700, in accordance with one embodiment. As shown, the saw blade 700 is equipped with a substantially thin circular configuration. The saw blade 700 further has a serrated periphery 702 for cutting heads from an accompanying wafer. As will soon become apparent, the saw blade 700 includes an outer portion 704 and a thickened inner portion 706 each with a disk-shaped configuration. As shown in FIG. 7, the thickened inner portion 706 has a diameter less than ½ the diameter of the outer portion 704.

FIG. 8 is a side view of the saw blade 700 taken along line 8—8 of FIG. 7. As shown, the saw blade 700 has a planar first face 710 and a second face 712. The planar first face 710 has the thickened inner portion 706 of the saw blade 700 integrally attached thereto. Further, the outer portion 704 has a first thickness while the thickened inner portion 706 has a second thickness greater than the first thickness. In one embodiment, the first thickness is at least twice the second thickness.

Figure 9:
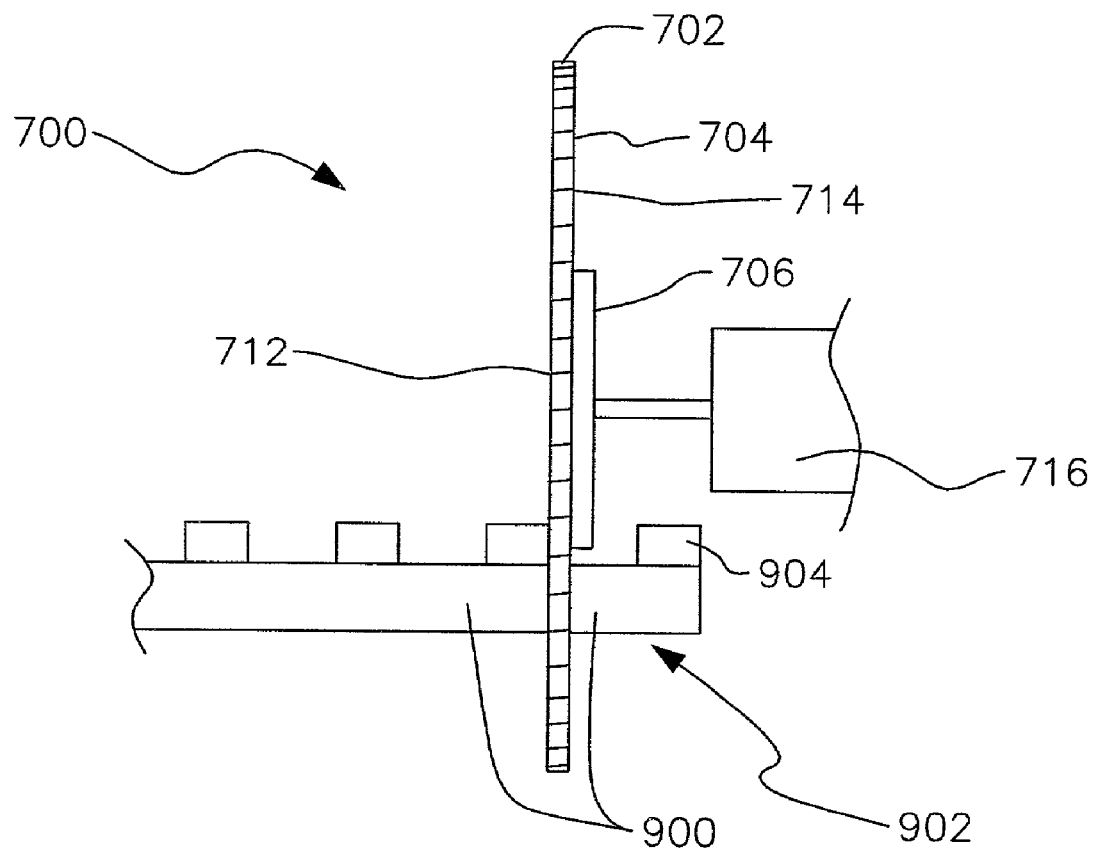
FIG. 9 shows the saw blade of FIGS. 7 and 8 while dicing heads on an accompanying wafer.

FIG. 9 shows the saw blade 700 of FIGS. 7 and 8 while dicing heads 900 on an accompanying wafer 902. As shown, such heads 900 are equipped with closures 904. In the context of the present description, a closure 904 may include any member integrally, adhesively or otherwise attached to a head 900 for enlarging an operating surface thereof. In operation, the saw blade 700 is adapted for cutting the wafer 902 along one of the closures 904 such that a surface of one of the heads 900 is exposed in coplanar relationship with a surface of the closure 904 attached thereto.

As shown in FIG. 9, the diameter of the thickened inner portion 706 is such that the thickened inner portion 706 resides on a side of the saw blade 700 opposite the closure 904 when cutting the wafer 902. This results in the thickened inner portion 706 extending within a gap defined by the closures 904.

By this design, the saw blade 700 is supported by the thickened inner portion 706 and resists any forces that would cause the saw blade 700 to bend. To this end, the surfaces of the resulting heads 900 are substantially planar, and thus exhibit improved operational characteristics.

Single Groove Magnetic Head

Figure 5:
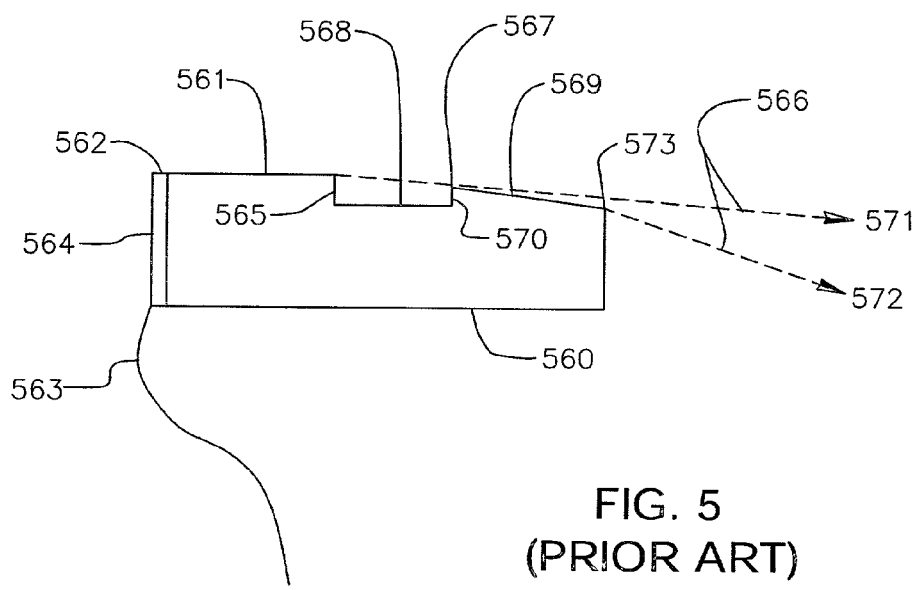
FIG. 5 is an end view illustration of a particular type of prior art bidirectional tape head.
Figure 10:
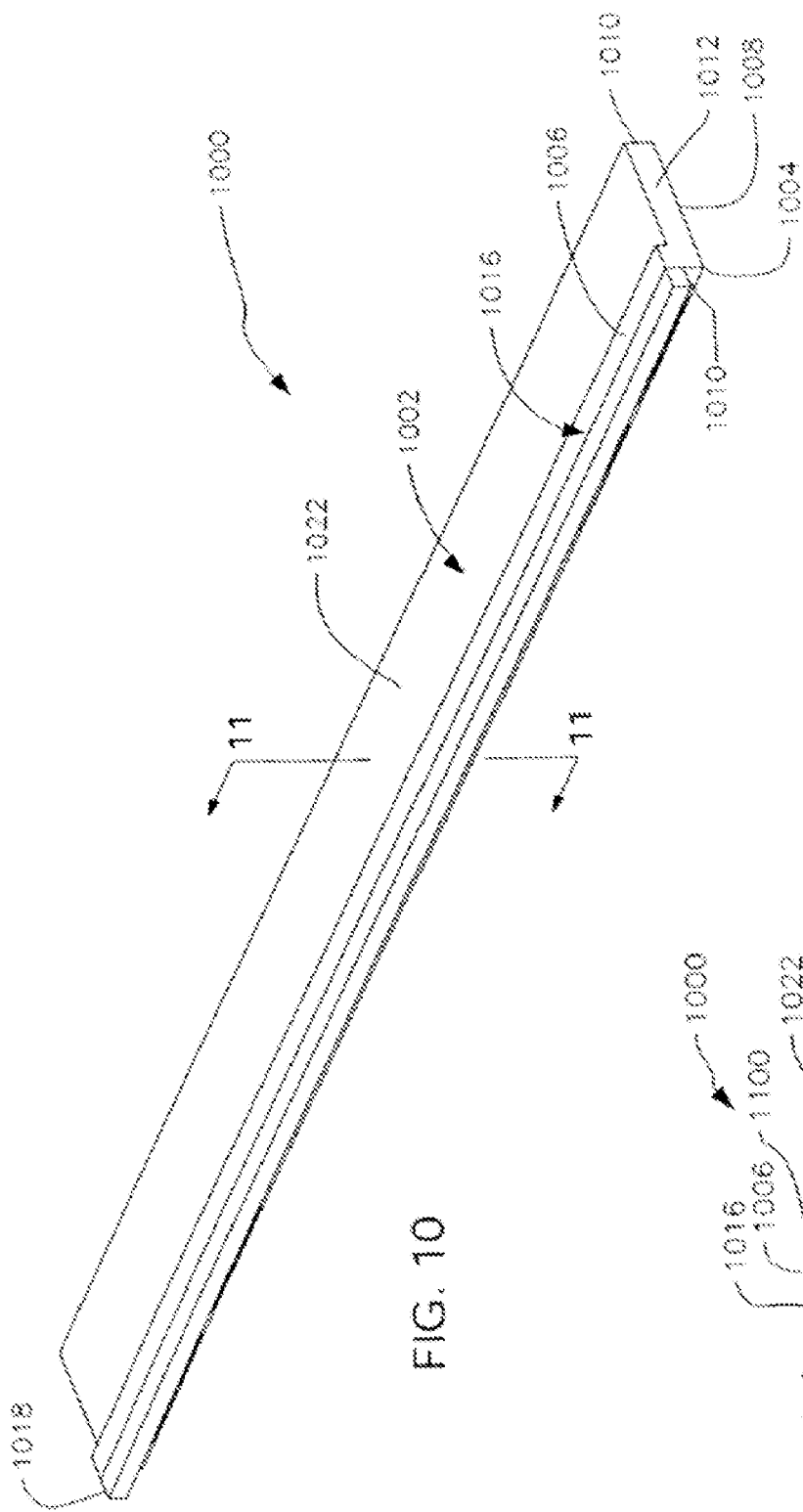
FIG. 10 is a perspective view of a magnetic head equipped with a single groove, in accordance with one embodiment.
Figure 11:
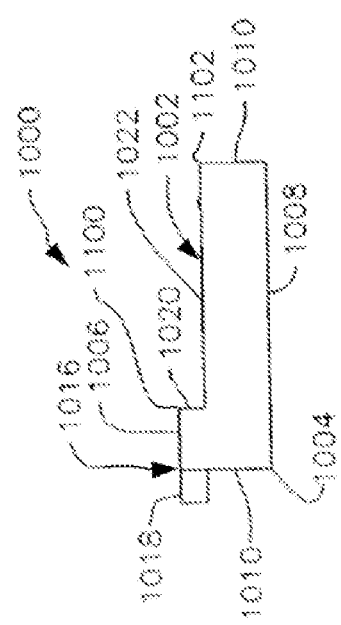
FIG. 11 is a cross-sectional view of the groove taken along line 11—11 shown in FIG. 10.

FIGS. 10 and 11 illustrate a magnetic head with a single groove formed therein for accomplishing the benefits of prior art magnetic head devices. As mentioned earlier, prior art magnetic head devices include an intermediate groove to afford a discontinuity edge adjacent the operating surface of the head. Moreover, a lapped surface is provided in order to provide control over the overwrap angle of the tape. See prior art FIG. 5.

FIG. 10 is a perspective view of a magnetic head 1000 equipped with a single groove 1002, in accordance with one embodiment. As shown, the magnetic head 1000 is provided with a head body 1004 having a substantially rectangular configuration. The head body 1004 includes a top face 1006, a bottom face 1008, a pair of elongated side faces 1010, and a pair of short end faces 1012. At least one transducer 1016 is formed in communication with the top face 1006 of the head body 1004.

Also provided is a closure 1018 with a substantially rectangular configuration. The closure 1018 has a length substantially equal to the head body 1004. Further, the closure 1018 is coupled to a first one of the side faces 1010 of the head body 1004 coincident with the top face 1006 thereof. The single groove 1002 is formed in the top face 1006 of the head body 1004, and extends between the transducers 1016 and a second one of the side faces 1010.

FIG. 11 is a cross-sectional view of the groove 1002 taken along line 11—11 shown in FIG. 10. As shown, the groove 1002 is defined by a first surface 1020 positioned in a plane substantially parallel with the side faces 1010. Such first surface 1020 is defined by edges coincident with the top face 1006 and the end faces 1012. Note FIG. 10.

The groove 1002 is further defined by a second surface 1022 positioned in a plane substantially parallel with the top and bottom faces (1006 and 1008). The second surface 1022 is defined by edges coincident with the first surface 1020, the end faces 1012 and the second one of the side faces 1010.

In use, the groove 1002 serves for providing a discontinuity edge 1100. Moreover, the groove 1002 controls an overwrap angle of a tape sliding along the at least one transducer 1016. This is accomplished by setting a depth of the groove 1002 which in turn selectively positions an outrigger edge 1102. Both the discontinuity edge 1100 and the overwrap angle control are thus afforded with a single cut during the manufacturing process, thus reducing an overall cost in producing the head.

Figure 12:
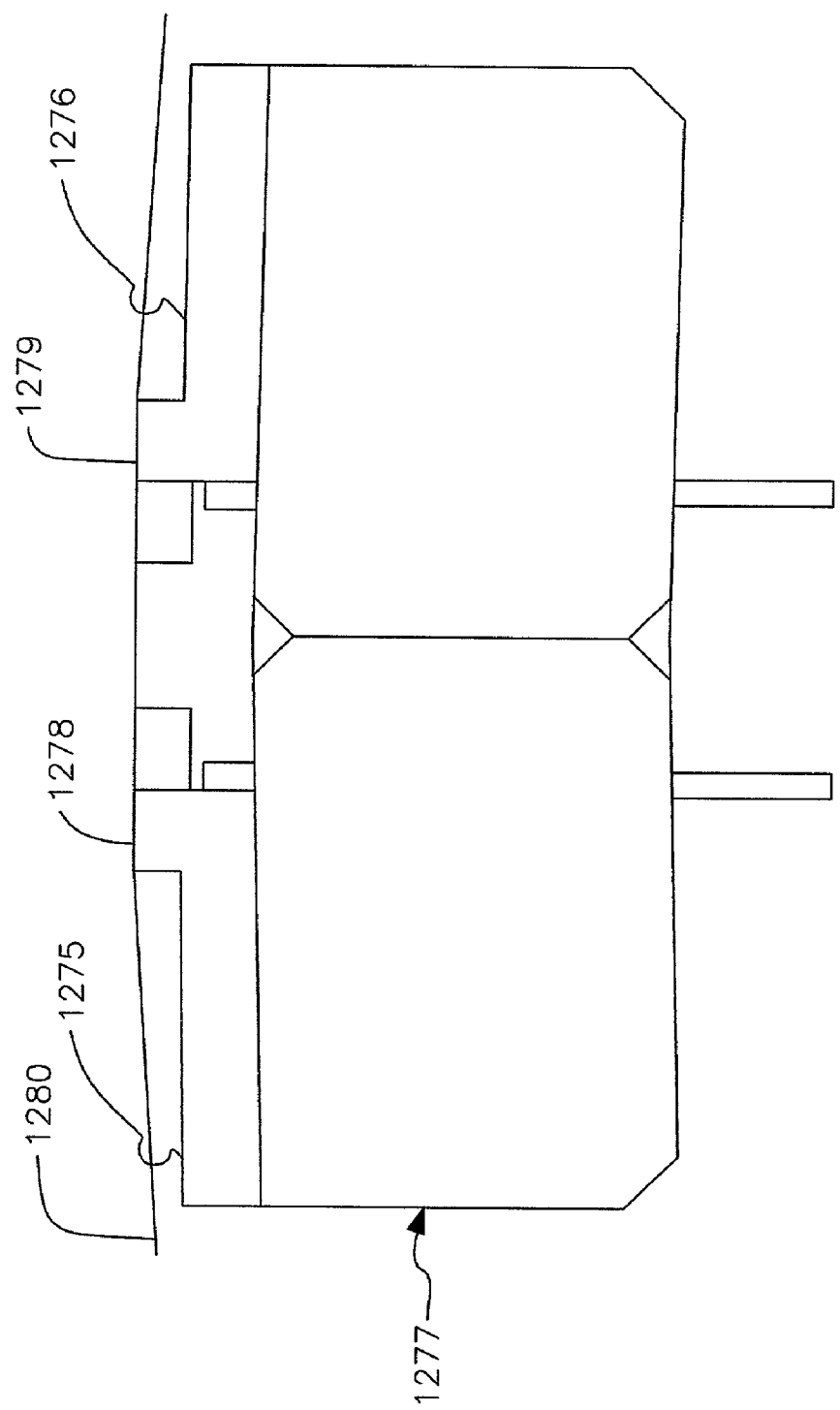
FIG. 12 illustrates the head of FIGS. 10 and 11 in use, in accordance with one embodiment.

FIG. 12 illustrates the head of FIGS. 10 and 11 in use, in accordance with one embodiment. As shown, FIG. 12 illustrates the head of FIGS. 10 and 11 for a read-while-write bidirectional linear tape drive. "Read-while-write" means that the read transducer follows behind the write transducer. This arrangement allows the data just written by the write transducer to be immediately checked for accuracy and true recording by the following read transducer.

Specifically, in FIG. 12, two heads 1275 and 1276 as illustrated in FIGS. 10 and 11 are mounted on U-beams 1277 which are, in turn, adhesively coupled. The wrap angle onto the flat transducing surfaces 1278 and 1279 of the tape 1280 is created by the U-beams 1277.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   a head body with a substantially rectangular configuration, including a top face,
   a bottom face, a pair of elongated side faces, and a pair of short end faces;
   at least one transducer formed in communication with the top face of the head body;
   a closure with a substantially rectangular configuration having a length substantially equal to the head body, the closure coupled to a first one of the side faces of the head body coincident with the top face thereof; and
   a single groove formed in the top face of the head body and extending between the at least one transducer and a second one of the side faces, the single groove defined by a first surface positioned in a plane substantially parallel with the side faces and defined by edges coincident with the top face and the end faces, and a second surface positioned in a plane substantially parallel with the top and bottom faces and defined by edges coincident with the first surface, the end faces and the second one of the side faces;
   wherein the single groove is adapted for providing a discontinuity edge and controlling an overwrap angle of a tape sliding along the at least one transducer.

2. A magnetic head, comprising:
   a head body including a top face, a bottom face, a pair of elongated side faces, and a pair of short end faces extending between the elongated side faces;
   at least one transducer formed in communication with the top face of the head body; and
   a single groove formed in the top face of the head body and extending between the at least one transducer and one of the side faces of the head body, the groove being defined by a substantially planar first surface, the first surface extending to an edge coincident with the first surface and the one of the side faces of the head body.

3. The magnetic head as recited in claim 2, and further comprising a closure coupled to a first one of the side faces of the head body coincident with the top face thereof.

4. The magnetic head as recited in claim 3, wherein the closure has a substantially rectangular configuration having a length substantially equal to the head body.

5. The magnetic head as recited in claim 4, wherein the first surface is positioned in a plane substantially parallel with the side faces of the head body.

6. The magnetic head as recited in claim 5, wherein the first surface is defined by edges coincident with the top face and the end faces of the head body.

7. The magnetic head as recited in claim 5, wherein the groove is further defined by a second surface positioned in a plane substantially parallel with the top and bottom faces of the head body.

8. The magnetic head as recited in claim 2, wherein the groove is adapted for providing a discontinuity edge and controlling an overwrap angle of a tape sliding along the at least one transducer.

9. A magnetic head comprising:
  a head body including a top face, a bottom face, a pair of elongated side faces, and a pair of short end faces;
  at least one transducer formed in communication with top face of the head body;
  a single groove formed in the top face of the head body and extending between the transducers and one of the side faces of the head body; and
  a closure coupled to a first one of the side faces of the head body coincident with the top face thereof,
  wherein the closure has a substantially rectangular configuration having a length substantially equal to the head body,
  wherein the first surface is positioned in a plane substantially parallel with the side faces of the head body,
  wherein the groove is further defined by a second surface positioned in a plane substantially parallel with the top and bottom faces of the head body,
  wherein the second surface of the groove is defined by edges coincident with the first surface, the end faces and the second one of the side faces of the head body.

10. A method for manufacturing a magnetic head, the method comprising;
  providing a head body including a top face, a bottom face, a pair of elongated side faces, and a pair of short end faces, wherein at least one transducer is formed in communication with the top face of the head body; and
  forming a single groove in the top face of the head body such that the single groove extends between the at least one transducer and one of the side faces of the head body, the groove being defined by a substantially planar first surface, the first surface extending to an edge coincident with the first surface and the one of the side faces of the head body.

* * * * *